(12) United States Patent
Müller et al.

(10) Patent No.: US 9,997,973 B2
(45) Date of Patent: Jun. 12, 2018

(54) MOTOR HOUSING

(71) Applicants: Rainer Müller, Zweiflingen-Pfahlbach (DE); Matthias Hennegriff, Ravenstein (DE); Christian Rückert, Lauda-Königshofen (DE)

(72) Inventors: Rainer Müller, Zweiflingen-Pfahlbach (DE); Matthias Hennegriff, Ravenstein (DE); Christian Rückert, Lauda-Königshofen (DE)

(73) Assignee: EBM PAPST MULFINGEN GmbH & CO. KG (DE)

( * ) Notice: Subject to any disclaimer, the term of this patent is extended or adjusted under 35 U.S.C. 154(b) by 610 days.

(21) Appl. No.: 14/598,620

(22) Filed: Jan. 16, 2015

(65) Prior Publication Data

US 2015/0207379 A1 Jul. 23, 2015

(30) Foreign Application Priority Data

Jan. 17, 2014 (DE) .................. 10 2014 200 763

(51) Int. Cl.
| | |
|---|---|
| *H02K 5/02* | (2006.01) |
| *H02K 5/22* | (2006.01) |
| *H02K 5/20* | (2006.01) |
| *H02K 9/02* | (2006.01) |
| *H02K 11/33* | (2016.01) |
| *H02K 5/10* | (2006.01) |
| *H02K 7/14* | (2006.01) |

(52) U.S. Cl.
CPC .................. *H02K 5/22* (2013.01); *H02K 5/02* (2013.01); *H02K 5/10* (2013.01); *H02K 5/20* (2013.01); *H02K 5/225* (2013.01); *H02K 7/14* (2013.01); *H02K 9/02* (2013.01); *H02K 11/33* (2016.01)

(58) Field of Classification Search
USPC .......................... 310/43, 52, 58, 64, 85, 89
See application file for complete search history.

(56) References Cited

U.S. PATENT DOCUMENTS

| | | | | |
|---|---|---|---|---|
| 7,015,606 | B2* | 3/2006 | Huang | H02K 1/32 310/61 |
| 7,095,146 | B2* | 8/2006 | Fukazawa | H02K 1/276 310/67 R |
| 7,196,439 | B2* | 3/2007 | Pierret | H02K 9/20 310/58 |

(Continued)

FOREIGN PATENT DOCUMENTS

| | | | | |
|---|---|---|---|---|
| DE | 10313273 | * | 10/2004 | ............... H02K 9/22 |
| DE | 102006016252 | * | 10/2007 | ............... H02K 5/04 |

(Continued)

*Primary Examiner* — Burton Mullins
(74) *Attorney, Agent, or Firm* — Tarolli, Sundheim, Covell & Tummino LLP (57) ABSTRACT

The invention relates to a motor housing for an electric motor with a stator as well as to an electric motor with a housing, whereby at least one multifunctional opening is arranged in the lower housing section and whereby electronics can be arranged in the housing, characterized in that, in order to cool the electronics, the multifunctional opening has a baffle by means of which an air flow can be directed towards the electronics, and, as an alternative, it has an offset on the side facing the upper housing section in order to mechanically connect the stator to the lower housing section.

13 Claims, 8 Drawing Sheets

(56) References Cited

U.S. PATENT DOCUMENTS

| | | | | |
|---|---|---|---|---|
| 7,211,914 B2* | 5/2007 | Hofmann | ................. | H02K 5/10 |
| | | | | 310/68 R |
| 7,723,875 B2* | 5/2010 | Fakes | ....................... | H02K 5/20 |
| | | | | 310/58 |
| 7,898,125 B2* | 3/2011 | Hosoi | ..................... | H02K 5/10 |
| | | | | 310/52 |
| 8,415,846 B2* | 4/2013 | Best | ....................... | H02K 5/10 |
| | | | | 310/43 |
| 8,704,418 B2* | 4/2014 | Rojo Lulic | ......... | H02K 1/2786 |
| | | | | 310/67 R |
| 9,153,971 B2* | 10/2015 | Sauer | .................... | H05K 5/068 |
| 2004/0027014 A1* | 2/2004 | Weigold | ................ | H02K 5/225 |
| | | | | 310/68 R |

FOREIGN PATENT DOCUMENTS

| | | | | | |
|---|---|---|---|---|---|
| DE | 102007034323 | * | 1/2009 | ............... | H02K 5/20 |
| DE | 102013020094 | * | 6/2015 | ............... | H02K 5/22 |
| DE | 102015210788 | * | 12/2016 | ............... | H02K 5/10 |
| EP | 2654183 | * | 10/2013 | ............... | H02K 3/52 |
| FR | 2969413 | * | 6/2012 | ............... | H02K 5/20 |

* cited by examiner

MOTOR HOUSING

RELATED APPLICATIONS

The present invention claims priority from DE 102014200763.1, filed 17 Jan. 2014, the entirety of which is incorporated herein by reference.

DESCRIPTION

The invention relates to a motor housing for an electric motor with a stator as well as to an electric motor with a housing.

Such electric motors are especially used to drive a fan propeller in a fan unit, whereby the parts of the electric motor heat up during operation, as a result of which they wear out faster, and moreover, the efficiency of the electric motor is reduced as a result of this the heating up. Generic electric motors have a stator fitted with motor windings and a rotor that surrounds the stator and that is configured as an external rotor, and they also have a motor housing comprising an upper housing section, a lower housing section and motor electronics arranged between the upper housing section and the lower housing section. The components of the motor electronics can be arranged on a printed circuit board. European Preliminary Published Application EP 2 654 183 A1 of the applicant discloses a generic electric motor in which, above the stator, the lower housing section widens towards the upper housing section in a disk-shaped manner so that, together with the upper housing section, it can accommodate the printed circuit board of the motor electronics with the electronic components. The upper housing section and the lower housing section are normally connected to each other so that the motor electronics situated between these housing sections are held between them. The electronic components and the printed circuit board can be surrounded by the air in the interior of the motor housing. The electronics of such generic electric motors also heat up during operation, as a result of which they can also wear out faster. Moreover, the temperature can also rise to such an extent that individual components can fail, as a result of which the electric motor can malfunction. In order to cool the components, it is a known procedure to make openings in the upper housing section in order to establish air circulation. A drawback of this is that dirt and/or moisture can get into the housing through the openings, as a result of which the assembly can malfunction.

Such openings cannot be provided if a high level of protection against moisture and/or dust is required. Moreover, in cases where a high level of protection against moisture and/or dust is required, the stator can be cast with a casting compound or encapsulated with an encapsulating compound, and furthermore, the housing sections can be sealed vis-à-vis each other by a gasket.

A drawback of such motor housings is that, depending on the required level of protection against moisture and/or dust, different housing sections with or without ventilation openings have to be used.

The objective of the invention is to put forward a motor housing for an electric motor with a stator and with a multifunctional opening in the lower housing section so that, if a low level of protection is required, it is possible to implement an active cooling of the motor electronics in the interior of the housing possible and otherwise, if the stator is encapsulated with a casting compound, the stator can be attached to the lower housing section in a simple and inexpensive manner.

A motor housing according to the invention, comprising a lower housing section and an upper housing section of an electric motor with a stator, whereby at least one multifunctional opening is arranged in the lower housing section and whereby electronics can be arranged in the housing, is characterized in that, in order to cool the electronics, the multifunctional opening has a baffle by means of which an air flow can be directed towards the electronics, and, as an alternative, it has an offset on the side facing the upper housing section in order to mechanically connect the stator to the lower housing section.

If no high requirements are made of the assembly in terms of dust and moisture protection, then air can flow to the electronics through the opening that is facing the area of the rotor so as to cool the electronics. Here, the baffle can be located in the axial direction below the multifunctional opening in the direction of the rotor. Due to the air flow coming from the rotor during operation and due to the direct cooling of the electronics with this air flow, there is no need for additional cooling by means of cooling elements or fans. Since the opening is concealed behind the rotor of the external-rotor motor, in spite of the cooling opening, the electronics are protected from being touched or getting very dirty, which would not be the case with openings in the cover part.

If the motor housing is used without an encapsulated stator, the baffle actively directs the air flow that is generated by the rotor during operation through the multifunctional opening towards the electronics. The cooling of the electronics is thus maximized. If the motor housing is used with an encapsulated stator, the baffle acts as an additional undercut for the casting compound so that the joining force between the lower housing section and the stator is maximized.

If a high level of protection against moisture and/or dust is required for the assembly, the stator can be surrounded by a casting compound. In this case, the opening serves as an undercut opening into which the casting or encapsulating compound can penetrate, thus filling up the opening. The penetration of the compound into the multifunctional opening gives rise to an inexpensive bond between the compound and the lower housing section. If an offset is provided on the side of the multifunctional opening facing the upper housing section, the compound can penetrate into the offset, thereby giving rise to a positive fit when the compound hardens. This increases the reliability of the bond between the lower housing section and the stator. Additional connection elements such as, for example, screws and the associated joining processes can be dispensed with. In this case, the opening is not used as a cooling opening.

It has proven to be advantageous if, above the stator, the lower housing section widens in the radial direction in a disk-shaped manner beyond the diameter of the stator towards the upper housing section, and if the electronics can be accommodated between the lower housing section and the upper housing section, whereby a rotor with a larger inner diameter than the outer diameter of the stator can be arranged in an area around the stator in the radial direction, and whereby the multifunctional opening is oriented in the axial direction towards the area of the rotor.

In an advantageous embodiment, the multifunctional opening has an essentially round geometry. A round geometry is technically easy to make during the production process.

In an alternative embodiment, the multifunctional opening has an essentially angular geometry. Due to this essentially angular geometry, the undercut surface area can be larger than a round geometry, thus making the connection stronger.

The baffle can be configured symmetrically so that, irrespective of the running direction of the rotor, it directs the air flow that is generated during operation through the multifunctional opening and onto the electronics. This embodiment is preferably used when the running direction of the motor is variable.

In an alternative embodiment, the baffle is configured asymmetrically so that the air flow that is generated during operation and that flows onto the electronics is maximized when the rotor is rotating in a given direction. This embodiment is advantageously used in motors that have only one running direction.

The baffle has side surfaces, whereby the side surfaces can be configured to be rectilinear or curved.

In an advantageous embodiment, the motor housing has several multifunctional openings, whereby the lower housing section has cutouts arranged on a partial circle in order to create a mechanical connection to the stator, and the multifunctional openings are arranged on a partial circle having essentially the same diameter. This partial circle has a diameter that essentially matches the outer diameter of the stator, as a result of which, if the multifunctional opening is used as a cooling opening, an air flow from the moving rotor onto the electronics is ensured, and if said multifunctional opening is used as a fastening means for the stator, the casting compound does not have to be incorporated into the area of the rotor any further than necessary, and on the other hand, a maximum fastening force is achieved.

If several multifunctional openings are provided, at least one multifunctional opening can have an essentially round geometry, whereas at least another multifunctional opening has an essentially angular geometry.

In an advantageous embodiment, the outer radial boundary of the lower housing section has a groove to accommodate a gasket. The gasket can be, for example, an O-ring. The use of a gasket between the upper housing section and the lower housing section further improves the protection of the motor housing against dust and/or moisture.

It has also proven to be advantageous for the motor housing to be made of a polymeric material. Since polymeric materials have a low thermal conductivity, the electronics are thermally decoupled from the winding.

An electric motor according to the invention has a motor housing according to the invention.

Additional advantages, special features and practical refinements of the invention ensue from the subordinate claims and from the presentation below of preferred embodiments with reference to the figures.

BRIEF DESCRIPTION OF THE DRAWINGS

The figures show the following:
FIG. 1 a motor housing in an exploded view,
FIG. 2 a lower housing section in a three-dimensional view,
FIG. 3 a section of a lower housing section with a round opening and an asymmetrical baffle in a three-dimensional view,
FIG. 4 a section of a lower housing section with a round opening and an asymmetrical baffle in a sectional view,
FIG. 5 a section of a lower housing section with a rectangular opening and an asymmetrical baffle in a three-dimensional view,
FIG. 6 a section of a lower housing section with a rectangular opening and an asymmetrical baffle in a sectional view,
FIG. 7 a section of a lower housing section with a round opening and a symmetrical baffle in a three-dimensional view,
FIG. 8 a section of a lower housing section with a round opening and a symmetrical baffle in a sectional view.

DETAILED DESCRIPTION

Figure 1:
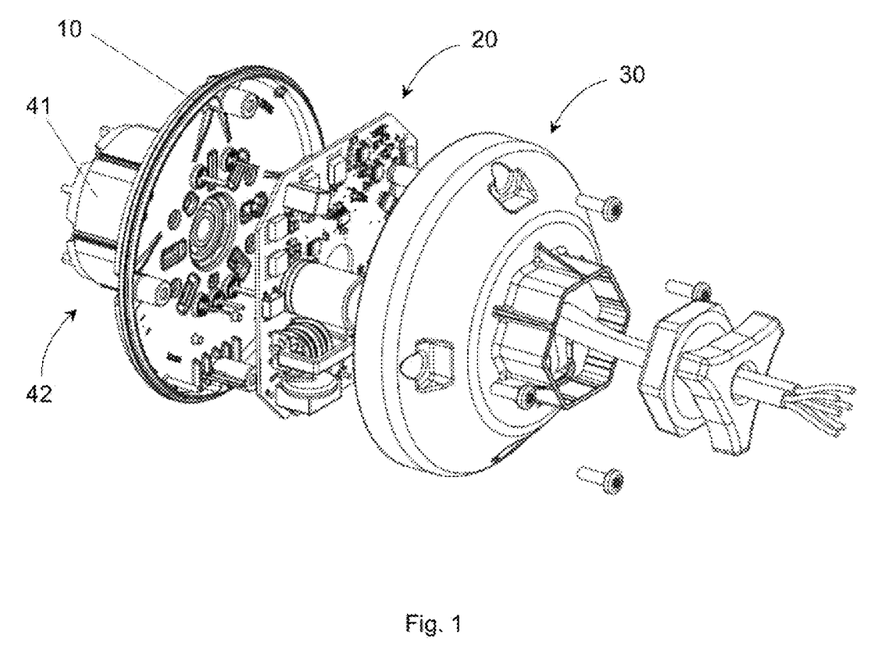

FIG. 1 shows a motor housing in an exploded view. The motor housing has a lower housing section 10 and an upper housing section 30, whereby electronics 20 with electronic components arranged on a printed circuit board are situated between the lower housing section 10 and the upper housing section 30. The stator 41 of an electric motor is attached to the lower housing section 10. The lower housing section 10 has four bores 11 in order to create a mechanical connection to the stator 41, so that the stator 41 can be joined to the upper section 10 with four screws. Above the stator 41, the lower housing section 10 widens towards the upper housing section 30 in the radial direction in a disk-shaped manner beyond the diameter of the stator 41, whereby a rotor with a larger inner diameter than the outer diameter of the stator 41 can be arranged in an area 42 around the stator 41. The lower housing section 10 has eight essentially rectangular multifunctional openings 120 that are oriented in the axial direction towards the area of the rotor. The multifunctional openings 120 have an offset 122 on the side facing the upper housing section 30. The stator 41 is not surrounded by an encapsulating compound and the multifunctional openings 120 are open, so that, owing to the rotation of the rotor during operation of the motor, air can flow through the multifunctional openings 120 to the electronics 20 and cool them. The multifunctional openings 120 are concealed behind the rotor of the external-rotor motor, so that, in spite of the cooling opening 120, the electronics are protected from being touched or getting very dirty.

If a high level of protection against moisture and/or dust is required for the assembly, the stator 41 can be surrounded by a casting compound (not shown here). In this case, the multifunctional openings 120 serve as undercut openings 120 into which the casting or encapsulating compound can penetrate, thus filling them up. The penetration of the compound into the offset 122 on the side of the lower housing section 10 facing the upper housing section 30 gives rise to a positive fit when the compound hardens, thus creating a reliable and inexpensive bond between the lower housing section 10 and the stator 41. Additional connection elements such as, for example, screws and the associated joining processes can be dispensed with.

Figure 2:
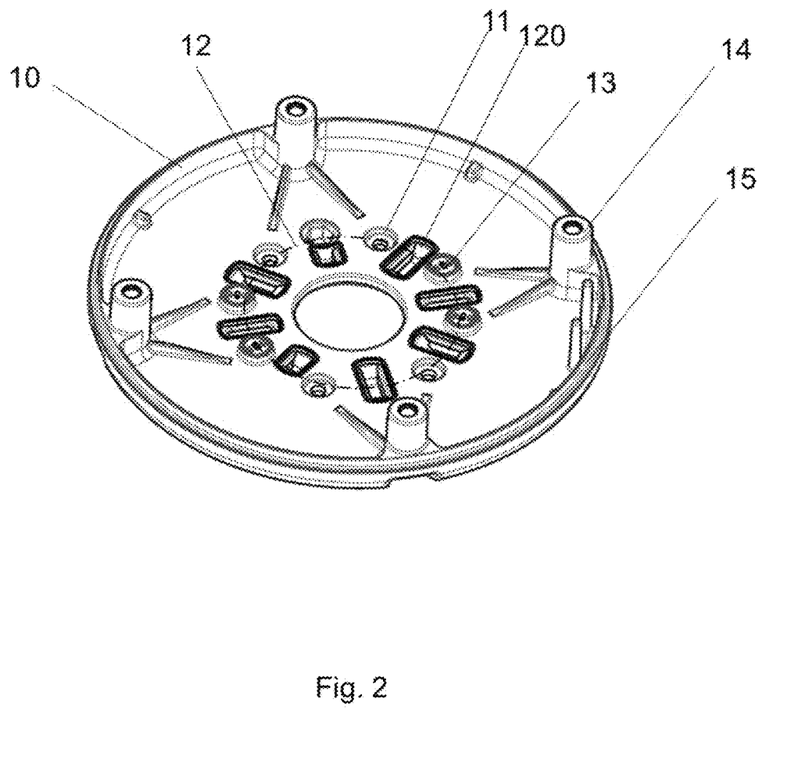

FIG. 2 shows the lower housing section 10 in a three-dimensional view. The four bores 11 for mechanically joining the stator 41 to the lower housing section 10 are located on a partial circle 12, whereby the eight multifunctional openings 120 are located on the same partial circle 12.

Moreover, the lower housing section 10 has four domes 14 to establish a screwed connection to the upper housing section 30. Screwing the lower housing section 10 to the upper housing section 30 creates a secure connection, as a result of which the electronics 20 can be securely held between the lower housing section 10 and the upper housing section 30.

Furthermore, the lower housing section 10 has four contact openings 13 via which the contacts of the stator 41 can pass through the upper housing section 10 and can make contact with the electronics 20.

Around the outer diameter of the lower housing section 10, there is a groove 15 into which a gasket such as, for example, an O-ring, can be placed, as a result of which a moisture-proof and dust-tight connection can be made between the housing sections 10, 30 when the lower housing section 10 and the upper housing section 30 are screwed together.

The multifunctional openings 120 can be configured to be essentially round or essentially angular. Moreover, the multifunctional openings 120 can have baffles 121 that can be configured symmetrically or asymmetrically.

Figure 3:
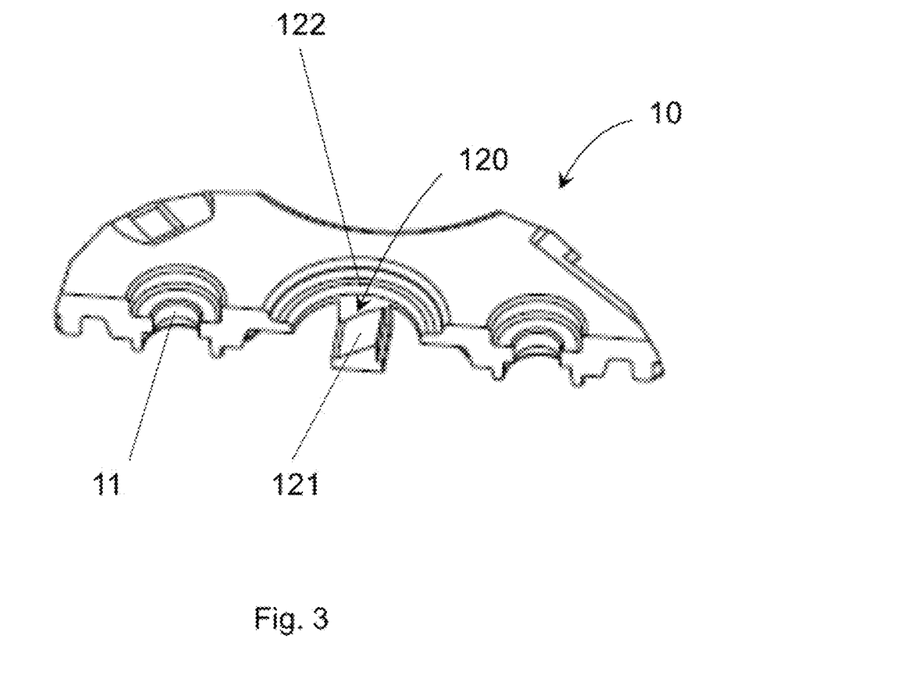

FIG. 3 shows a section of a lower housing section 10 with a round multifunctional opening 120 and an asymmetrical baffle 121 in a three-dimensional view. A round geometry is easy to make during the production process. The multifunctional opening 120 also has a baffle 121 located below the multifunctional opening 120 in the direction of the rotor. If the motor housing is used without an encapsulated stator 41, the baffle 121 actively directs the air flow that is generated by the rotor during operation through the multifunctional opening 120 towards the electronics 20. The cooling of the electronics 20 is thus maximized. If the motor housing is used with an encapsulated stator 41, the baffle 121 acts as an additional undercut for the casting compound so that the bonding force between the lower housing section 10 and the stator 41 is maximized. The baffle 121 is configured asymmetrically so that the air flow that is generated by the rotor during operation and that flows onto the electronics 20 is maximized if the rotor is rotating in a given direction.

Figure 4:
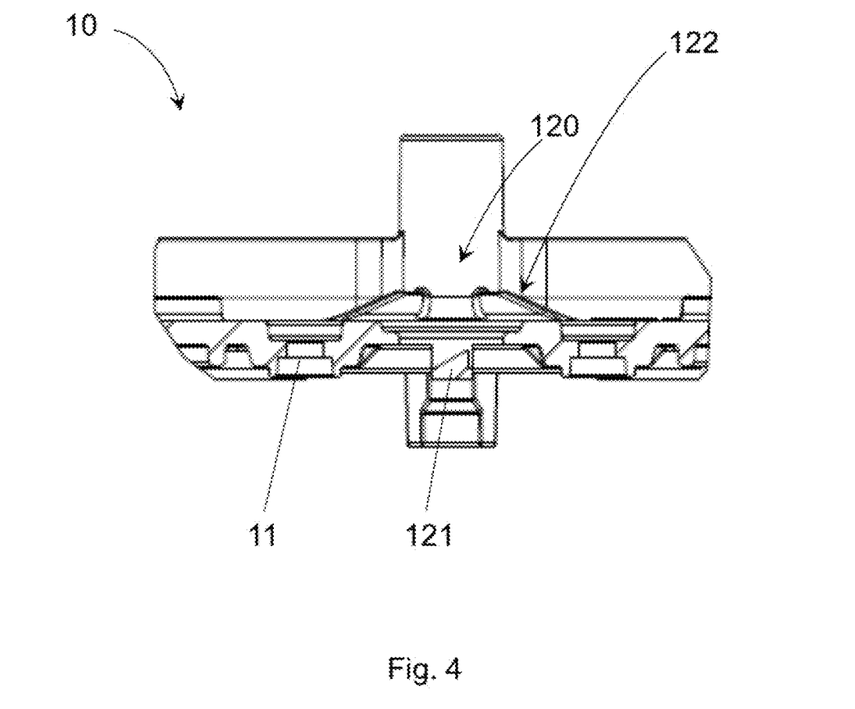

FIG. 4 shows the section of the lower housing section 10 with a round opening and the asymmetrical baffle of FIG. 3 in a sectional view, whereby the offset 122 of the multifunctional opening 120 can be clearly seen.

Figure 5:
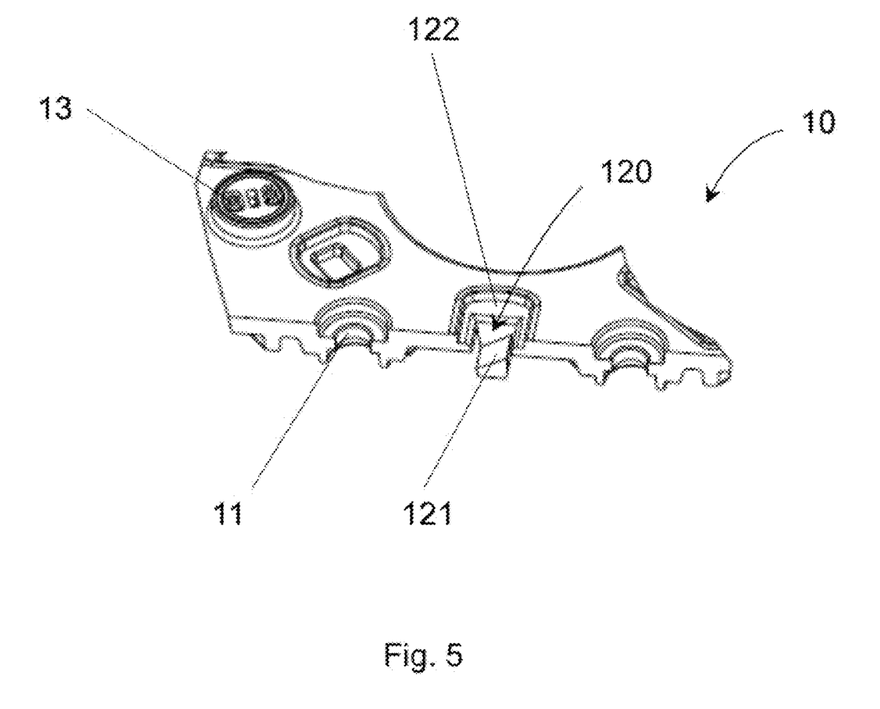
Figure 6:
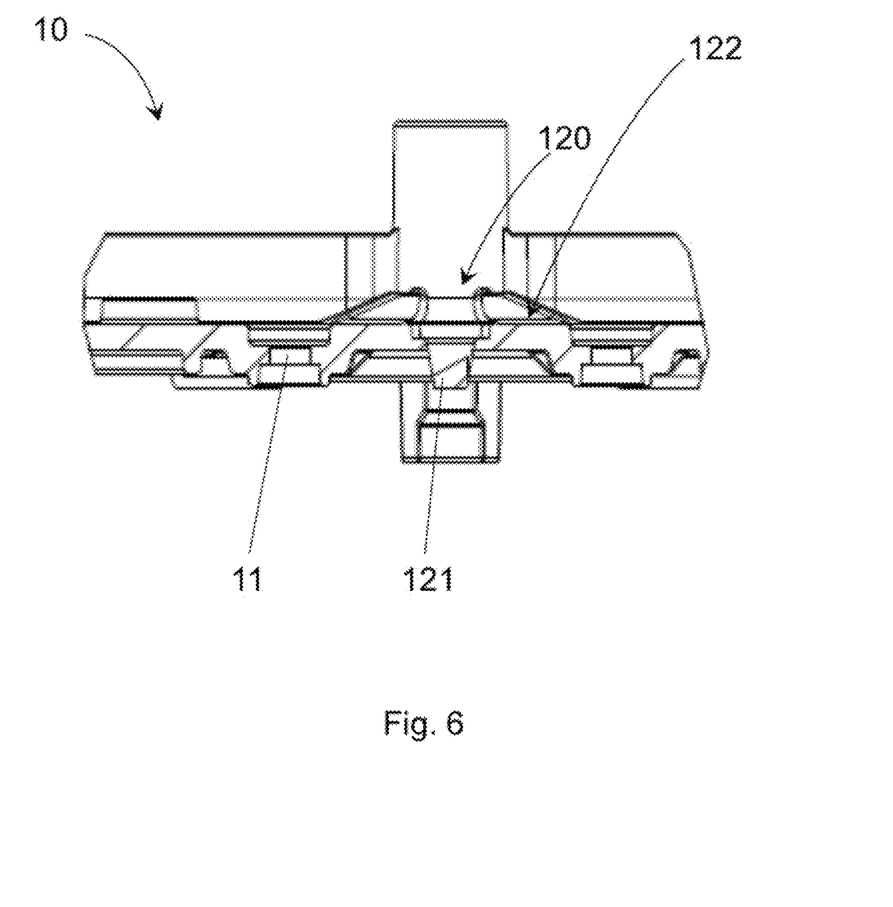

FIG. 5 shows a section of a lower housing section 10 with a rectangular multifunctional opening 120 and an asymmetrical baffle 121 in a three-dimensional view, while FIG. 6 shows the same section of the lower housing section 10 in a sectional view. Due to the rectangular geometry, the undercut surface area can be larger than a round geometry, thus making the connection stronger.

Figure 7:
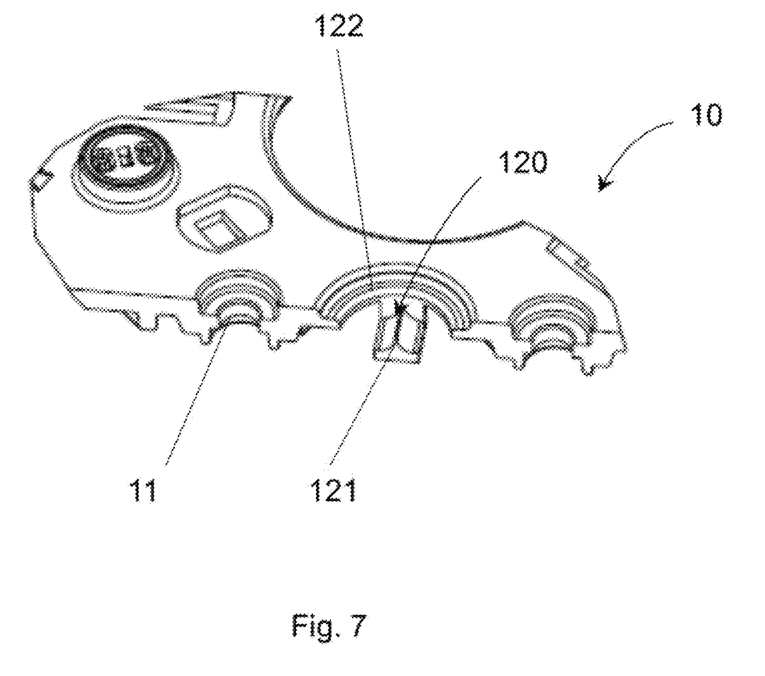
Figure 8:
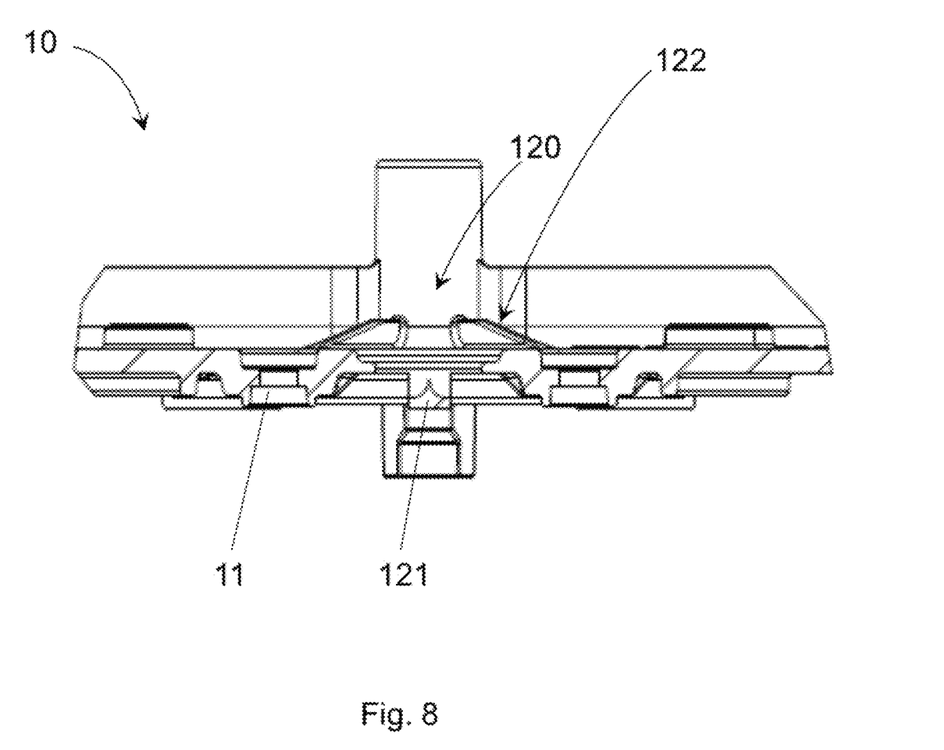

FIG. 7 shows a section of a lower housing section 10 with a round multifunctional opening 120 and a symmetrical baffle 121 in a three-dimensional view, while FIG. 8 shows the same section of the lower housing section 10 in a sectional view. Since the baffle 121 is configured symmetrically, it directs the generated air flow through the multifunctional opening 120 and onto the electronics 20, irrespective of the running direction of the rotor.

The motor housing is made of a plastic material. Since polymeric materials have a low thermal conductivity, the electronics are thermally decoupled from the winding.

The embodiments shown here are merely examples of the present invention and therefore must not be construed in a limiting manner. Alternative embodiments taken into consideration by the person skilled in the art are likewise encompassed by the scope of protection of the present invention.

LIST OF REFERENCE NUMERALS 10 lower housing section
11 bore
12 partial circle
13 contact opening
14 dome
15 groove
20 electronics
30 upper housing section
41 stator
42 rotor area
120 multifunctional opening
121 baffle
122 offset

The invention claimed is:

1. A motor housing comprising:
    a lower housing section and an upper housing section configured to house an electric motor with a stator, the lower housing section having at least one multifunctional opening, the multifunctional opening comprising:
        a baffle to direct an air flow towards electronics arranged in the housing to cool the electronics, and
        an offset on a side facing the upper housing section to mechanically connect the stator to the lower housing section when a casting or encapsulating compound penetrates into and fills up the offset.

2. The motor housing according to claim 1, wherein, above the stator, the lower housing section widens towards the upper housing section in the radial direction in a disk-shaped manner beyond the diameter of the stator, and the electronics can be accommodated between the lower housing section and the upper housing section, whereby a rotor with a larger inner diameter than the outer diameter of the stator can be arranged in an area around the stator in the radial direction, and whereby the multifunctional opening is oriented in the axial direction towards the area of the rotor.

3. The motor housing according to claim 1, wherein the multifunctional opening has an essentially round geometry.

4. The motor housing according to claim 1, wherein the multifunctional opening has an essentially angular geometry.

5. The motor housing according to claim 4, wherein the baffle is configured symmetrically.

6. The motor housing according to claim 4, wherein the baffle is configured asymmetrically.

7. The motor housing according to claim 6, wherein the baffle has rectilinear side surfaces.

8. The motor housing according to claim 6, wherein the baffle has curved side surfaces.

9. The motor housing according to claim 1, wherein the motor housing has several multifunctional openings, whereby the lower housing section has cutouts arranged on a partial circle in order to create a mechanical connection to the stator, and the multifunctional openings are arranged on a partial circle having essentially the same diameter.

10. The motor housing according to claim 9, wherein at least one multifunctional opening has an essentially round geometry, whereas at least another multifunctional opening has an essentially angular geometry.

11. The motor housing according to claim 1, wherein the outer radial boundary of the lower housing section has a groove to accommodate a gasket.

12. The motor housing according to claim 1, wherein the motor housing is made of a polymeric material.

13. An electric motor, wherein the electric motor has a motor housing according to claim 1.

* * * * *